US011582430B2

(12) United States Patent
Kim et al.

(10) Patent No.: US 11,582,430 B2
(45) Date of Patent: Feb. 14, 2023

(54) ELECTRONIC DEVICE COMPRISING IMAGE SENSOR AND METHOD OF OPERATION THEREOF

(71) Applicant: Samsung Electronics Co., Ltd., Gyeonggi-do (KR)

(72) Inventors: Dongsoo Kim, Gyeonggi-do (KR); Jaehyoung Park, Gyeonggi-do (KR); Hwayong Kang, Gyeonggi-do (KR); Shuichi Shimokawa, Gyeonggi-do (KR); Takafumi Usui, Gyeonggi-do (KR); Youngkwon Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/134,644

(22) Filed: Dec. 28, 2020

(65) Prior Publication Data
US 2021/0211615 A1 Jul. 8, 2021

(30) Foreign Application Priority Data
Jan. 3, 2020 (KR) .......................... 10-2020-0000985

(51) Int. Cl.
*H04N 9/04* (2006.01)
*H04N 5/217* (2011.01)

(52) U.S. Cl.
CPC ....... *H04N 9/04515* (2018.08); *H04N 5/2173* (2013.01); *H04N 9/04551* (2018.08)

(58) Field of Classification Search
CPC ............ H04N 9/04515; H04N 5/2173; H04N 9/04551
See application file for complete search history.

(56) References Cited

U.S. PATENT DOCUMENTS

| 8,310,573 | B2 | 11/2012 | Hirota |
| 8,520,103 | B2 | 8/2013 | Hirota |
| 8,754,967 | B2 | 6/2014 | Hirota |
| 9,179,113 | B2 | 11/2015 | Tachi |
| 9,210,391 | B1 | 12/2015 | Mills |
| 9,219,870 | B1 | 12/2015 | Mills et al. |

(Continued)

OTHER PUBLICATIONS

International Search Report dated Apr. 22, 2021.

*Primary Examiner* — Jason A Flohre
(74) *Attorney, Agent, or Firm* — Cha & Reiter, LLC

(57) ABSTRACT

According to certain embodiments, an image sensor including a pixel, the pixel including a micro lens, a plurality of photodiodes, and a color filter disposed between the plurality of photodiodes and the micro lens; a processor operatively connected to the image sensor; and a memory operatively connected to the processor, wherein the memory stores one or more instructions that, when executed by the image sensor, cause the image sensor to perform a plurality of operations, the plurality of operations comprising: determining whether the image sensor is in a high-resolution mode; when the image sensor is in the high-resolution mode, calculating a disparity based on signals detected from the plurality of photodiodes; when the disparity is not greater than a threshold value, applying a first remosaic algorithm to the signals; and when the disparity is greater than the threshold value, applying a second remosaic algorithm to the signals.

18 Claims, 10 Drawing Sheets

(56) References Cited

U.S. PATENT DOCUMENTS

| | | | |
|---|---|---|---|
| 9,253,377 B2 | 2/2016 | Hiwada et al. | |
| 9,674,505 B2 | 6/2017 | Wu et al. | |
| 9,710,885 B2 | 7/2017 | Lee et al. | |
| 9,756,266 B2 | 9/2017 | Mills et al. | |
| 9,804,357 B2 | 10/2017 | Galor Gluskin et al. | |
| 9,986,184 B2 | 5/2018 | Seo et al. | |
| 10,044,959 B2 | 8/2018 | Galor Gluskin et al. | |
| 10,491,836 B2 | 11/2019 | Park et al. | |
| 2012/0154637 A1* | 6/2012 | Hara | H04N 5/36961 348/239 |
| 2013/0100338 A1* | 4/2013 | Iwasaki | H04N 5/36961 348/353 |
| 2013/0335604 A1 | 12/2013 | Hirota | |
| 2014/0009634 A1 | 1/2014 | Hiwada et al. | |
| 2014/0253808 A1 | 9/2014 | Tachi | |
| 2015/0195446 A1* | 7/2015 | Saito | G02B 7/34 348/353 |
| 2016/0037103 A1 | 2/2016 | Seo et al. | |
| 2016/0080728 A1* | 3/2016 | Cole | H04N 13/20 348/49 |
| 2016/0110843 A1 | 4/2016 | Mills et al. | |
| 2016/0165216 A1 | 6/2016 | Wu et al. | |
| 2016/0171651 A1* | 6/2016 | Lee | G06T 3/4015 382/300 |
| 2016/0349522 A1* | 12/2016 | Onuki | H01L 27/14627 |
| 2017/0094149 A1 | 3/2017 | Galor Gluskin et al. | |
| 2017/0094210 A1 | 3/2017 | Galor Gluskin et al. | |
| 2017/0359522 A1 | 12/2017 | Park et al. | |
| 2017/0374299 A1* | 12/2017 | Liu | G06T 5/50 |
| 2018/0343404 A1* | 11/2018 | Hwang | H04N 5/3559 |
| 2019/0008361 A1* | 1/2019 | Imai | A61B 1/0669 |
| 2019/0028640 A1* | 1/2019 | Kanda | H04N 5/23296 |
| 2019/0213435 A1* | 7/2019 | Nikhara | G06T 7/50 |
| 2019/0222738 A1* | 7/2019 | Galor Gluskin | H04N 5/232935 |
| 2020/0007760 A1* | 1/2020 | Yokokawa | H04N 5/347 |
| 2020/0194484 A1* | 6/2020 | Miura | H01L 27/14627 |
| 2020/0294191 A1* | 9/2020 | Chuang | G06T 3/4015 |
| 2020/0358989 A1* | 11/2020 | Hoshino | H01L 27/14621 |
| 2021/0065404 A1* | 3/2021 | Hayasaka | G06T 5/50 |
| 2021/0217134 A1* | 7/2021 | Okamura | H04N 9/07 |

* cited by examiner

ELECTRONIC DEVICE COMPRISING IMAGE SENSOR AND METHOD OF OPERATION THEREOF

CROSS-REFERENCE TO RELATED APPLICATION(S)

This application is based on and claims priority under 35 U.S.C. § 119 to Korean Patent Application No. 10-2020-0000985, filed on Jan. 3, 2020, in the Korean Intellectual Property Office, the disclosure of which is incorporated by reference herein its entirety.

BACKGROUND

1. Field

The disclosure relates to an electronic device including an image sensor and a method of operating the electronic device.

2. Description of Related Art

An image sensor is a device that converts an optical image into an electrical signal. With the development of computer and communication industries, there is an increasing demand for a high-performance image sensor in various electronic devices such as a digital camera, a camcorder, a personal communication system (PCS), gaming consoles, security cameras, a medical micro camera, a robot, and the like.

It is desirable to provide a higher resolution image sensor.

The above information is presented as background information only to assist with an understanding of the disclosure. No determination has been made, and no assertion is made, as to whether any of the above might be applicable as prior art with regard to the disclosure.

SUMMARY

According to certain embodiments, an image sensor including a pixel, the pixel including a micro lens, a plurality of photodiodes, and a color filter disposed between the plurality of photodiodes and the micro lens; a processor operatively connected to the image sensor; and a memory operatively connected to the processor, wherein the memory stores one or more instructions that, when executed by the image sensor, cause the image sensor to perform a plurality of operations, the plurality of operations comprising: determining whether the image sensor is in a high-resolution mode; when the image sensor is in the high-resolution mode, calculating a disparity based on signals detected from the plurality of photodiodes; when the disparity is not greater than a threshold value, applying a first remosaic algorithm to the signals; and when the disparity is greater than the threshold value, applying a second remosaic algorithm to the signals.

According to certain embodiments, an image capturing method by an electronic device including an image sensor comprises: determining, by the image sensor, whether the image sensor is in a high-resolution mode; when the image sensor is in the high-resolution mode, calculating a disparity based on signals detected from a plurality of photodiodes included in the image sensor, wherein the image sensor includes a pixel having a micro lens and the plurality of photodiodes facing each other with a color filter interposed between the plurality of photodiodes and the micro lens; when the disparity is not greater than a threshold value, applying a first remosaic algorithm to the signals; and when the disparity is greater than the threshold value, applying a second remosaic algorithm to the signals.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

An image sensor may include a plurality of pixels, and a single pixel may include at least one micro lens, at least one photo diode, and at least one color filter.

When image sensor includes a single micro lens for each pixel and corresponds to one or two photodiodes for each micro lens, it is difficult, if note impossible, to increase the resolution. Alternatively, the resolution may be increased only horizontally or vertically depending on the arrangement of the photodiode, and thus it may be difficult to implement a stable high-resolution image.

Aspects of the disclosure may address at least the above-mentioned problems and/or disadvantages and may provide at least the advantages described below. Accordingly, an aspect of the disclosure may provide an electronic device including an image sensor capable of stably implementing a high-resolution image.

Hereinafter, certain embodiments of the disclosure will be described with reference to accompanying drawings. However, it should be understood that this is not intended to limit the disclosure to specific implementation forms and includes various modifications, equivalents, and/or alternatives of embodiments of the disclosure.

Figure 1:
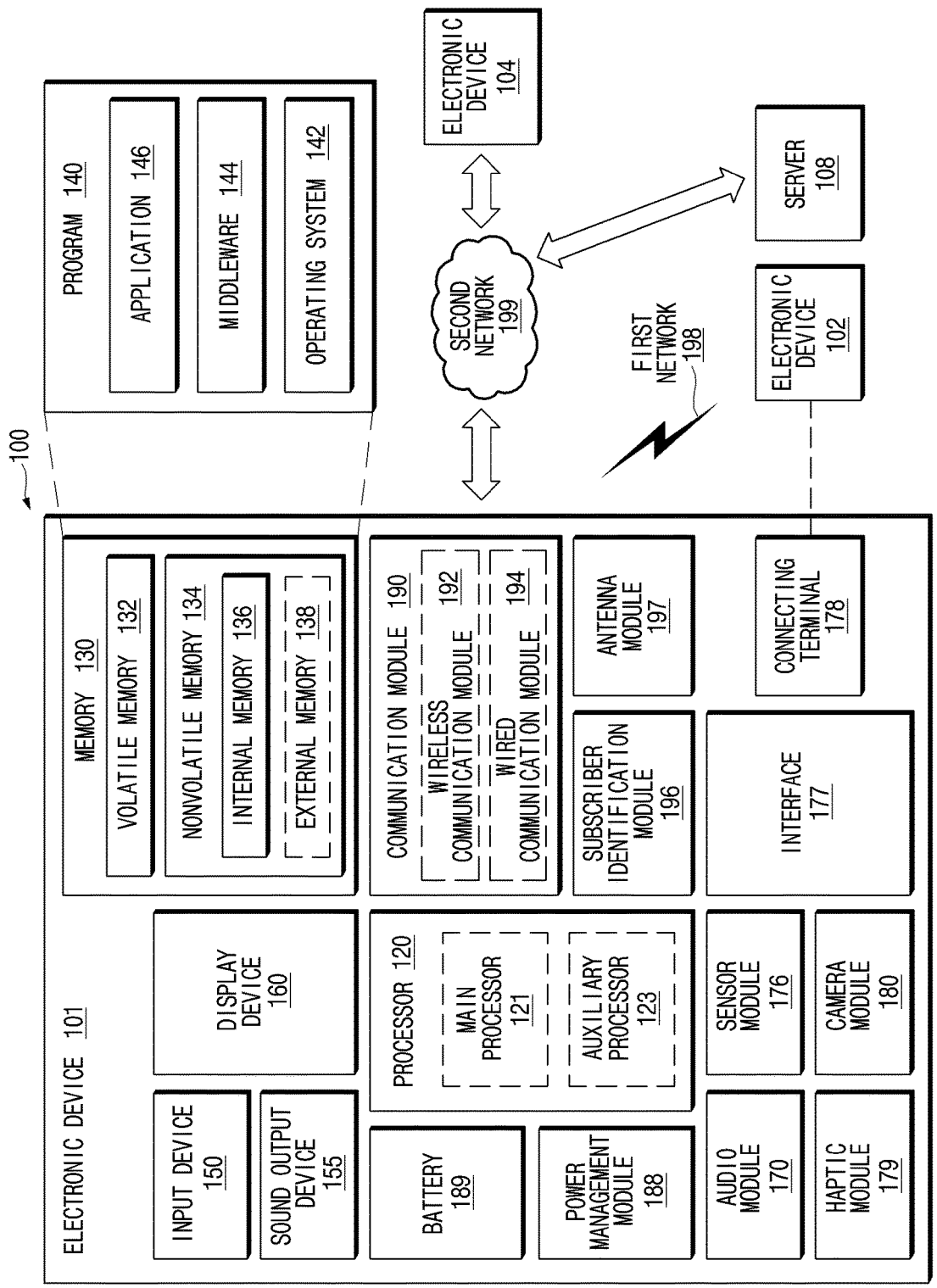
FIG. 1 is a block diagram of an electronic device 101 in a network environment 100, according to certain embodiments.

FIG. 1 is a diagram illustrating an electronic device in a network environment according to certain embodiments. Referring to FIG. 1, an electronic device 101 may communicate with an electronic device 102 through a first network 198 (e.g., a short-range wireless communication network) or may communicate with an electronic device 104 or a server 108 through a second network 199 (e.g., a long-distance wireless communication network) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display). "Processor" shall be understood to refer to both the singular and plural contexts, unless otherwise clearly stated.

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 102 (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device 104 through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by one or more external electronic devices among the external electronic devices 102, 104, or 108. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
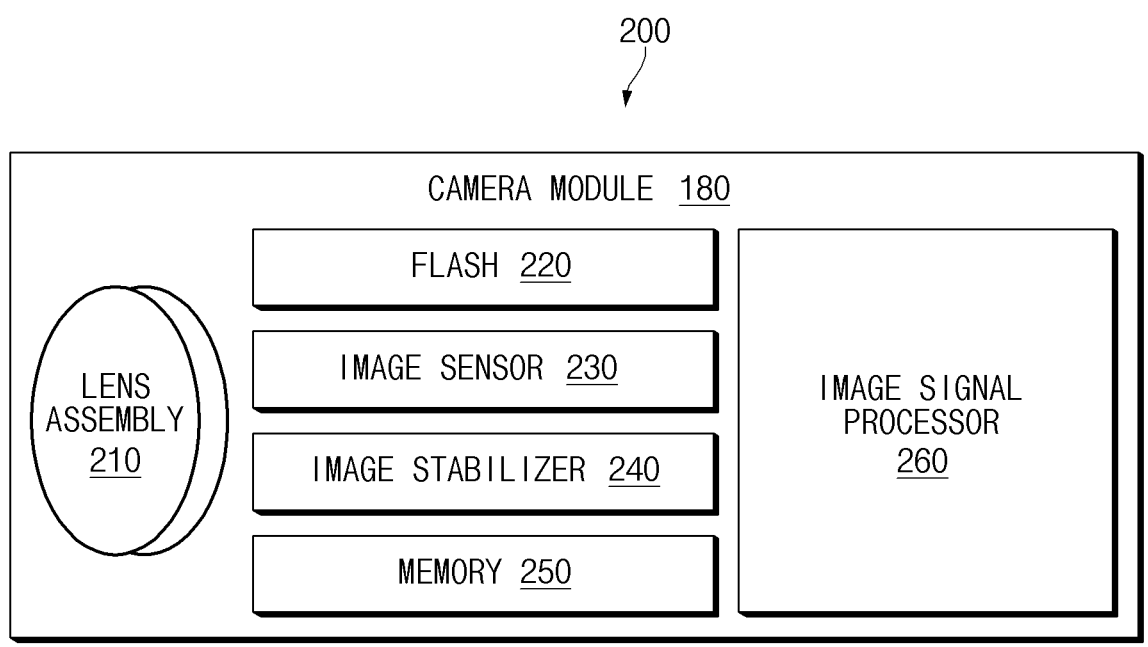
FIG. 2 is a block diagram 200 illustrating a camera module 180, according to certain embodiments.

FIG. 2 is a block diagram 200 illustrating the camera module 180 according to certain embodiments. Referring to FIG. 2, the camera module 180 may include a lens assembly 210, a flash 220, an image sensor 230, an image stabilizer 240, a memory 250 (e.g., buffer memory), or an image signal processor 260. The lens assembly 210 may collect light emitted from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light emitted or reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, when the image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, when a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing on an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may control (e.g., exposure time control or read-out timing control) at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. When the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Hereinafter, an image sensor included in an electronic device according to an embodiment disclosed in this specification will be described with reference to FIGS. 3, 4, and 5. The same configurations as those of the above-described embodiment may be referenced by the same reference numerals, and description thereof may be omitted.

Figure 3:
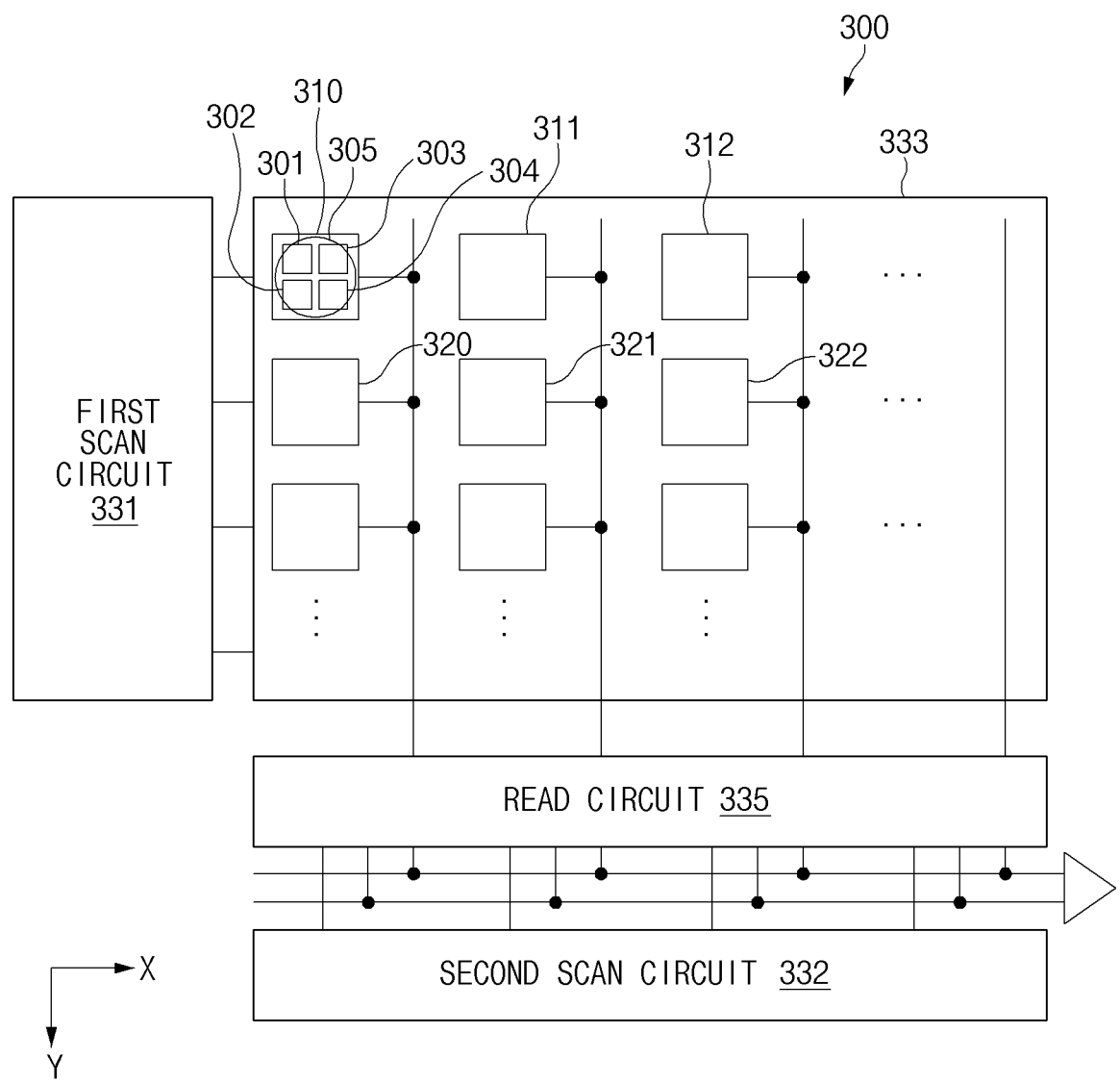
FIG. 3 is a diagram schematically illustrating a structure of an image sensor included in an electronic device according to an embodiment disclosed in this specification.

FIG. 3 is a diagram schematically illustrating a structure of an image sensor 300 included in an electronic device according to an embodiment disclosed in this specification. FIG. 4 is a schematic diagram illustrating a plurality of pixels 400 included in the image sensor of FIG. 3. FIG. 5 is a cross-sectional view 500 illustrating a cross-section of one pixel of FIG. 4 taken along line z-z'.

Referring to FIG. 3, the image sensor 300 included in the electronic device (e.g., the electronic device 101 of FIG. 1) may include a first scan circuit 331, a second scan circuit 332, a pixel array 333, and a read circuit 335.

The pixel array 333 may include a plurality of pixels (310, 311, 312, ..., 320, 321, 322, ...). For example, the plurality of pixels (310, 311, 312, ..., 320, 321, 322, ...) may be arranged along X direction (e.g., a row direction) and Y direction (e.g., a column direction).

The first scan circuit 331 and the second scan circuit 332 may detect a signal for each of the plurality of pixels (310, 311, 312, ..., 320, 321, 322, ...) under the control of the processor (e.g., the processor 120 of FIG. 1). The first scan circuit 331 may detect a signal for each of a plurality of pixels in Y direction. The second scan circuit 332 may detect a signal for each of the plurality of pixels (310, 311, 312, ..., 320, 321, 322, ...) in X direction. The read circuit 335 may read the detected signal.

According to an embodiment, each of the plurality of pixels (310, 311, 312, ..., 320, 321, 322, ...) may include a single micro lens 305, a plurality of photodiodes 301, 302, 303, and 304, and a color filter 501 (red, green or blue) having a single color.

Hereinafter, a single pixel included in the pixel array of the image sensor will be described in detail with reference to FIGS. 4 and 5.

Figure 4:
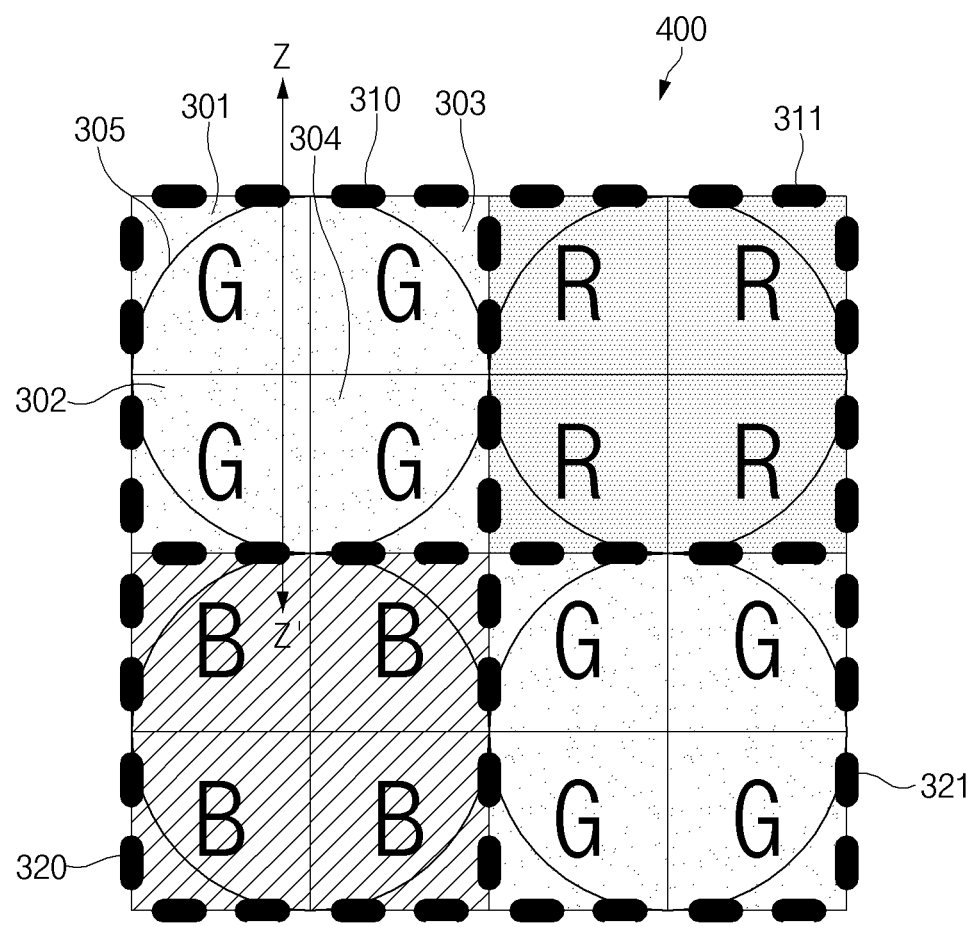
FIG. 4 is a schematic diagram illustrating a plurality of pixels included in the image sensor of FIG. 3.

Referring to FIG. 4, the pixel array of the image sensor may include the plurality of pixels (310, 311, . . . 320, 321, . . . ). According to an embodiment, the first pixel 310 may include one micro lens 305, four photodiodes 301, 302, 303, and 304, and a green color filter (G). A plurality of pixels (e.g., the second pixel 311, the third pixel 320, and the fourth pixel 321) included in the pixel array may have the same structure as the first pixel 310, and thus a description thereof will be omitted. However, the colors of color filters included in the plurality of pixels may be green (G), and may be also different from one another, such as red (R), blue (B), or the like.

Besides, an embodiment is exemplified in FIG. 4 as the single pixel 310 includes four photodiodes 301, 302, 303, and 304 arranged in a 2×2 arrangement, but this is only an example. For example, the single pixel 310 includes a plurality of photodiodes arranged in a 3×3 array, a 4×4 array, . . . , or an n×n array (however, 'n' is a natural number greater than 1). It is sufficient that the single pixel 310 has the same symmetrical structure in which the number of horizontally-arranged photodiodes is the same as the number of vertically-arranged photodiodes.

Figure 5:
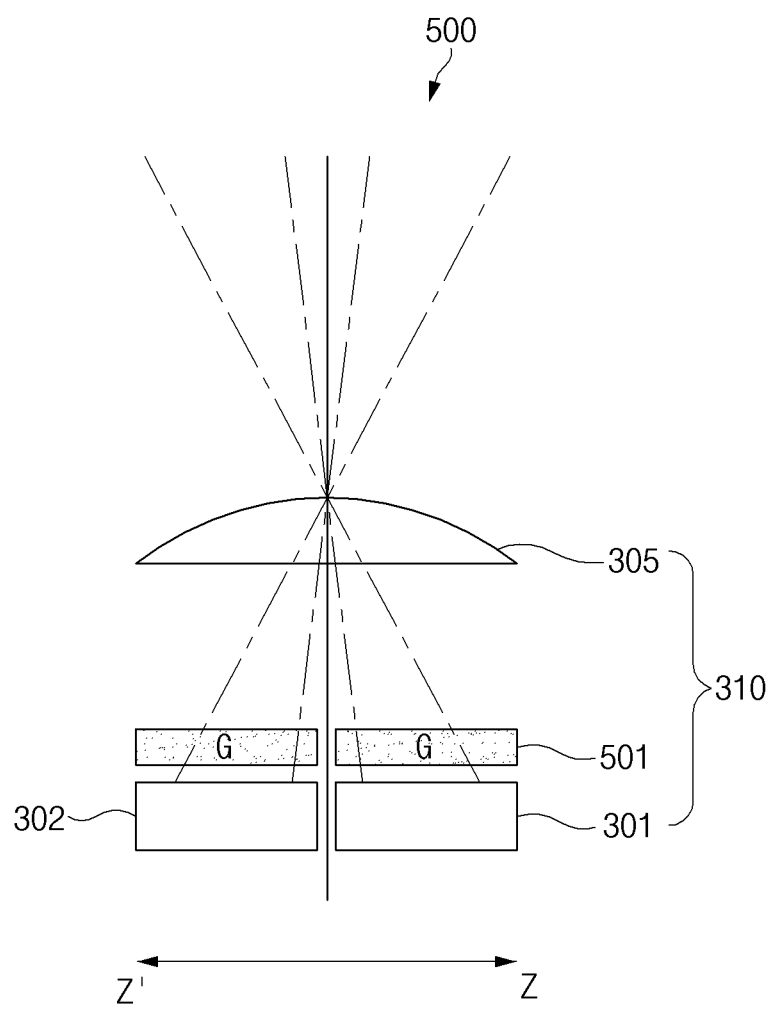
FIG. 5 is a cross-sectional view illustrating a cross-section of one pixel of FIG. 4 taken along line z-z'.

Referring to FIG. 5, in the first pixel 310, the micro lens 305 and the photodiodes 301 and 302 may be disposed to face each other with a color filter 501 disposed therebetween. The light incident on the image sensor may be converged by the micro lens 305 and may be incident on different photodiodes 301 or 302. The signal for the light incident on each photodiode may be detected by the first scan circuit (e.g., the first scan circuit 331 of FIG. 3) or the second scan circuit (e.g., the second scan circuit 332 of FIG. 3).

Hereinafter, the operation of an image sensor included in an electronic device according to an embodiment disclosed in this specification will be described with reference to FIGS. 6, 7, 8, 9, and 10. The same configurations as those of the above-described embodiment may be referenced by the same reference numerals, and description thereof may be omitted.

Figure 6:
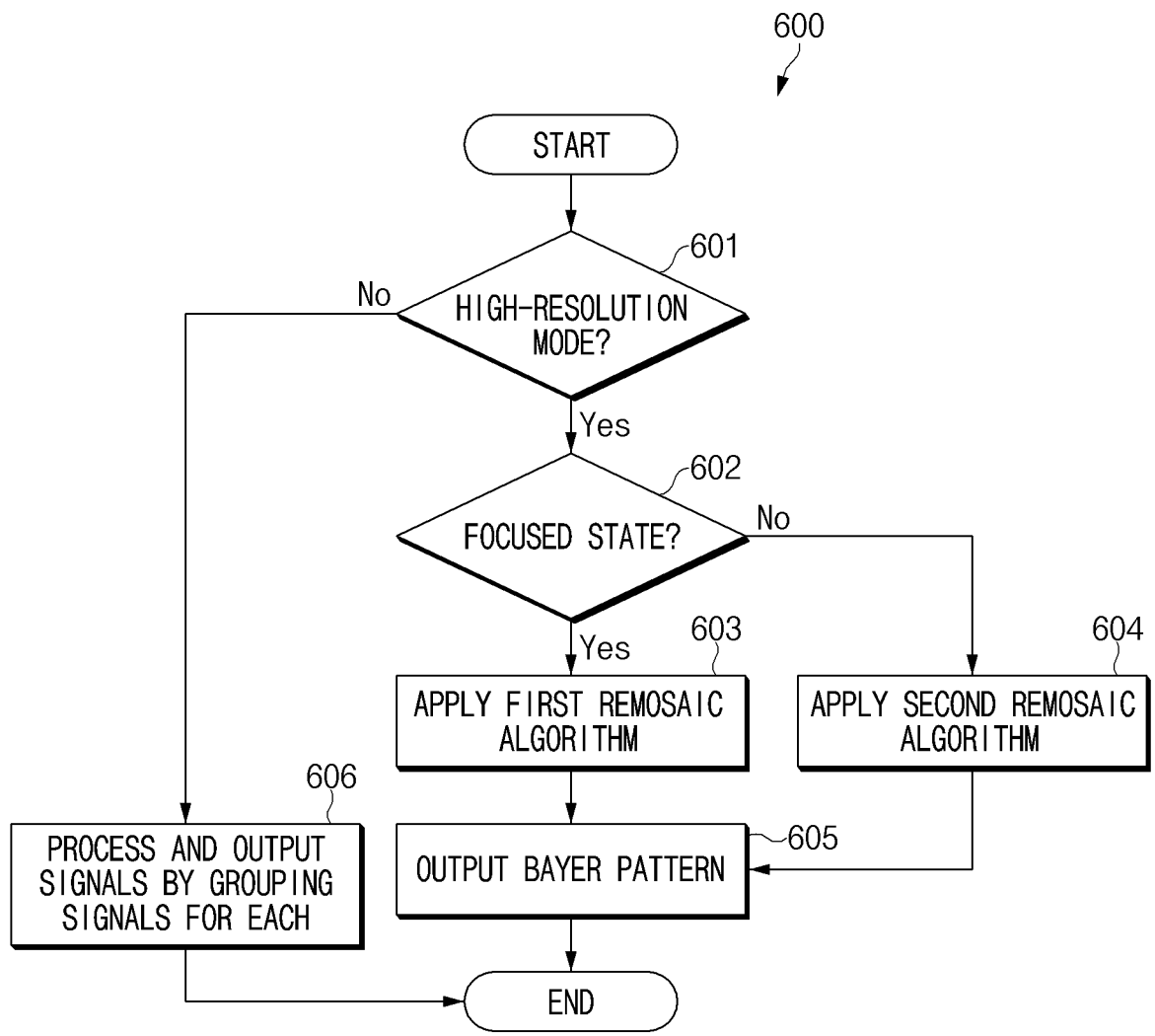
FIG. 6 is a flowchart illustrating an operation of an image sensor included in an electronic device according to an embodiment disclosed in the specification.
Figure 7:
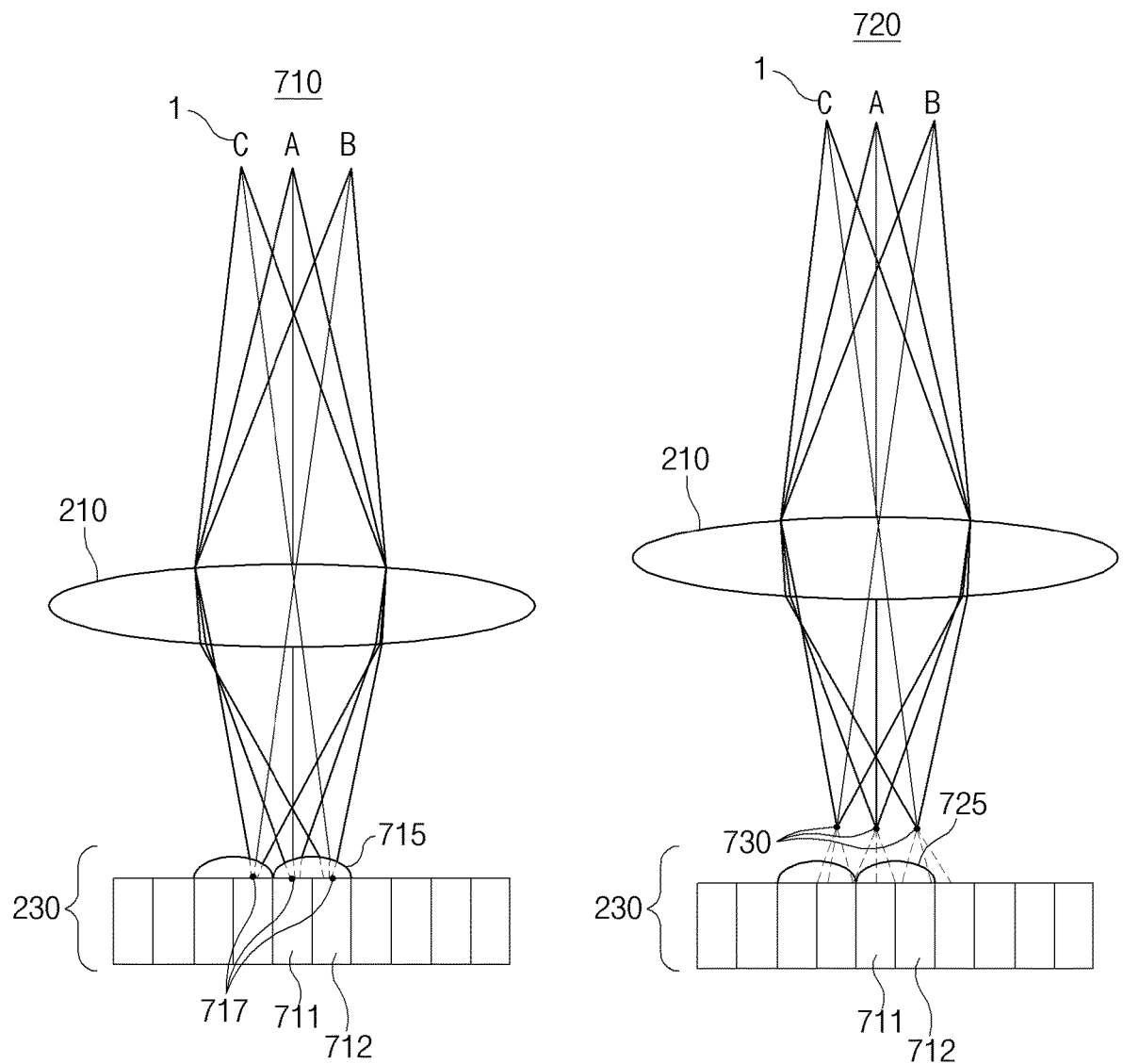
FIG. 7 is a diagram illustrating an on-focus state and an out-focus state of an image sensor included in an electronic device according to an embodiment disclosed in the specification.
Figure 8:
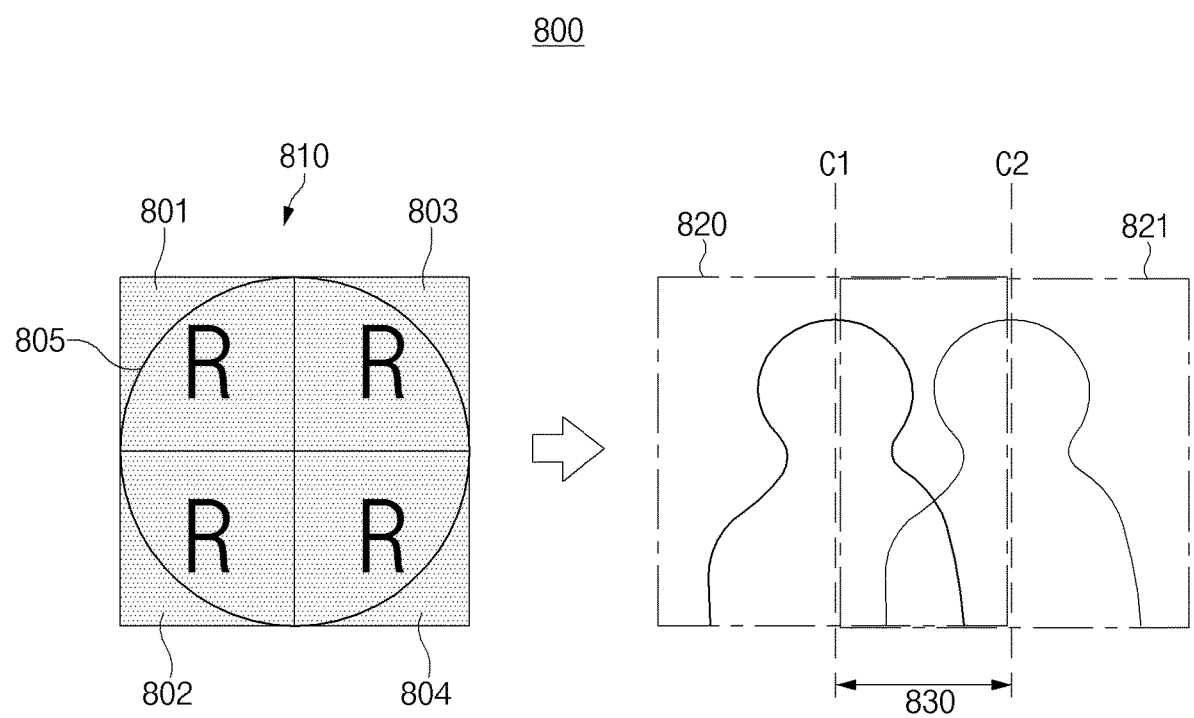
FIG. 8 is a diagram schematically illustrating a method of determining whether an image sensor included in an electronic device is in an on-focus state, according to the disclosure in the specification.
Figure 9:
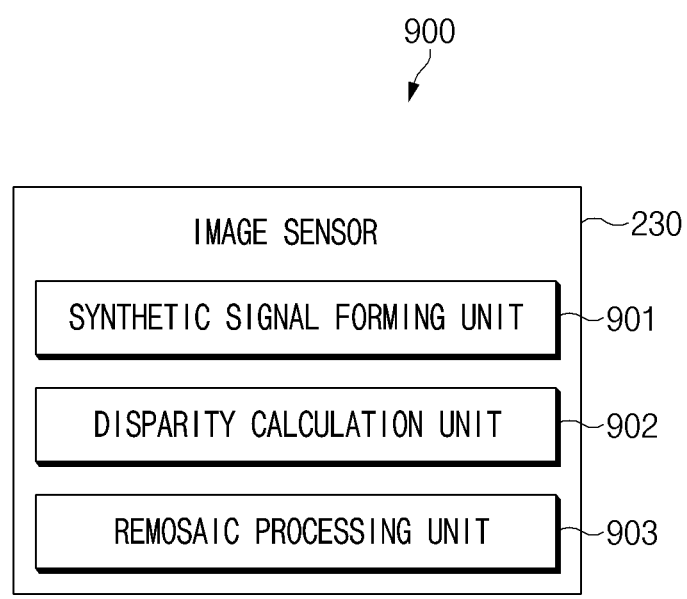
FIG. 9 is a block diagram of an image sensor included in an electronic device according to an embodiment disclosed in the specification.
Figure 10:
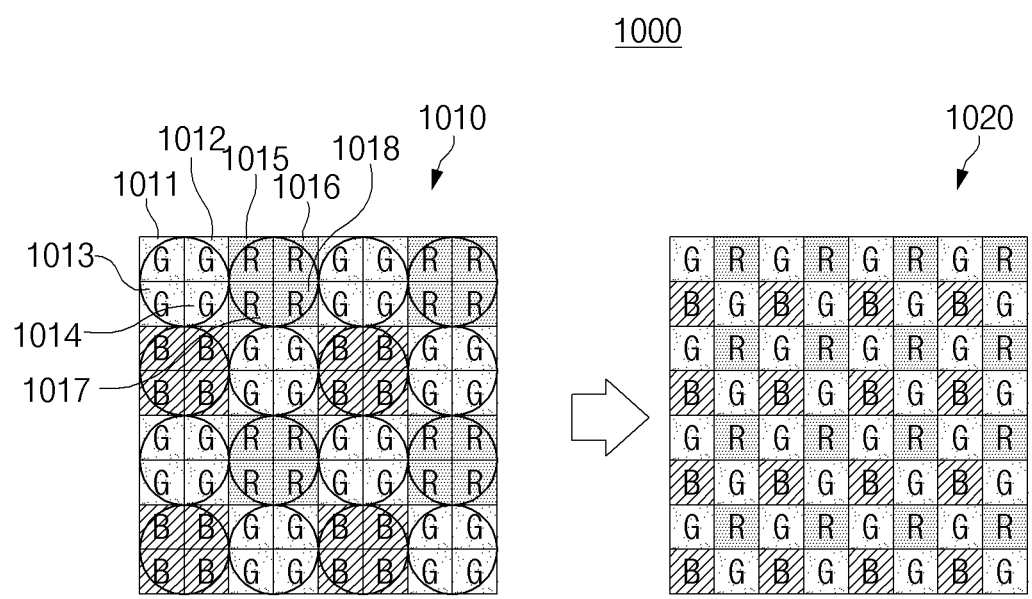
FIG. 10 is a diagram illustrating an example of forming a Bayer-patterned image based on signals of an image sensor included in an electronic device according to an embodiment disclosed in the specification.

FIG. 6 is a flowchart 600 illustrating an operation of an image sensor included in an electronic device according to an embodiment disclosed in the specification. FIG. 7 is a diagram illustrating an on-focus state 710 and an out-focus state 720 of an image sensor included in an electronic device according to an embodiment disclosed in the specification. FIG. 8 is a diagram 800 schematically illustrating a method of determining whether an image sensor included in an electronic device is in an on-focus state, according to the disclosure in the specification. FIG. 9 is a block diagram 900 of an image sensor included in an electronic device according to an embodiment disclosed in the specification. FIG. 10 is a diagram 1000 illustrating an example of forming a Bayer-patterned image based on signals of an image sensor included in an electronic device according to an embodiment disclosed in the specification.

Referring to FIG. 6, in operation 601, an image sensor (e.g., the image sensor 230 of FIG. 2) included in the electronic device (e.g., the electronic device 101 of FIG. 1) may determine whether a camera module (e.g., the camera module 180 of FIG. 2) or image sensor corresponds to the high-resolution mode. The high-resolution mode/low-resolution mode of the camera module or image sensor may be determined depending on the power state of the electronic device, illuminance, or settings of a user.

According to one embodiment, in operation 601, when it is determined that the camera module or image sensor is in the high-resolution mode, the image sensor in operation 602 may determine whether the image sensor is in focused states or an unfocused state.

According to an embodiment, a state where the image sensor is in focus may be referred to as an on-focus state; a state where the image sensor is out of focus may be referred to as an out-focus state. According to an embodiment, the state (on-focus state) where the image sensor is in focus may include not only a state where the image sensor is exactly in focus, but also a state where the image sensor is in focus by a predetermined value or more.

Hereinafter, the a focused state 710 and the out-of-focus state 720 of the image sensor will be described in detail with reference to FIG. 7.

According to an embodiment, the image sensor 230 of the electronic device (e.g., the electronic device 101 of FIG. 1) may detect the light converged through the lens assembly 210 after being reflected from an object 1 to be captured. The light converged through the lens assembly 210 after being reflected from the object 1 may be incident on a plurality of photodiodes 711 and 712 through a micro lens 715 of the image sensor 230. The image sensor 230 may determine whether the image captured is in focus by identifying a signal for light incident on the plurality of photodiodes 711 and 712. When the image sensor is in the focused state 710, it may be seen that the light incident on each of the photodiodes 711 and 712 forms a single focus or that light converges at the photodiode or at a point 717 within a threshold distance from the photodiode; when the image sensor is in the out-of-focus state 720, it may be seen that the light incident on each of the photodiodes 711 and 712 is scattered at the photodiode. That is the light converges at a point that is away from the photodiode, or at a point 730 that is beyond the threshold distance from the photodiode. It is noted that although point 730 is between the photodiodes 711, 712 and the lens assembly 210, point 730 can also be located past the photodiodes 711, 712.

Hereinafter, a method in which the image sensor of the electronic device determines an on-focus state and an out-focus state will be described in detail with reference to FIGS. 8 and 9.

Referring to FIG. 8, according to an embodiment, a single pixel 810 included in the pixel array of the image sensor 230 may include a first photodiode 801, a second photodiode 802, a third photodiode 803, a fourth photodiode 804, a micro lens 805, and a color filter (R). Furthermore, referring to FIG. 9, the image sensor 230 may include a synthetic signal forming unit 901, a disparity calculation unit 902, and a remosaic processing unit 903.

The image sensor 230 may detect a first signal, which is a signal for light incident on the first photodiode 801 through the micro lens 805, and a second signal, which is a signal for light incident on the second photodiode 802, through a scan circuit (e.g., the first scan circuit 331 and/or the second scan circuit 332 of FIG. 3) to transmit the first signal and the second signal to the synthetic signal forming unit 901 of the image sensor 230. The synthetic signal forming unit 901 of the image sensor 230 may form a left signal image 820 by synthesizing the received first signal and second signal.

Furthermore, the image sensor 230 may detect a third signal, which is a signal for light incident on the third photodiode 803 through the micro lens 805, and a fourth signal, which is a signal for light incident on the fourth photodiode 804, through the scan circuit (e.g., the first scan circuit 331 and/or the second scan circuit 332 of FIG. 3) to transmit the first signal and the second signal to the synthetic signal forming unit 901 of the image sensor 230. The synthetic signal forming unit 901 of the image sensor 230 may form a right signal image 821 by synthesizing the received third signal and fourth signal.

The disparity calculation unit 902 of the image sensor 230 may calculate a disparity 830 between the left signal image 820 and the right signal image 821, which are formed by the synthetic signal forming unit 901. The disparity 830 may be a distance between the center line c1 of the left signal image 820 and the center line c2 of the right signal image 821. As the disparity 830 is greater, this may mean that the extent to which the image captured by the image sensor 230 is out of focus is greater. When the center line c1 of the left signal image 820 completely overlaps with the center line c2 of the right signal image 821, the disparity 830 is 0. This may mean that the image sensor 230 is in the exactly on-focus state.

When the disparity 830 is not greater than a threshold value, it may be determined that the image sensor 230 is in a focused state; when the disparity 830 exceeds the threshold value, it may be determined that the image sensor 230 is in an out-of-focus state. At this time, the threshold value may be determined by the image sensor based on at least one of a user's setting, a capturing environment (illumination, or the like), or the result of analyzing an image of the image sensor. For example, when the disparity 830 is not greater than 1,mm, it may be determined that the image sensor 230 is in a focused state; when the disparity 830 is greater than 1 mm, it may be determined that the image sensor 230 is in an out-of-focus state.

Returning to FIG. 6, when it is determined, in operation 602, that the image sensor is in an on-focus state, in operation 603, the image sensor may apply a first remosaic algorithm to signals detected from a plurality of photodiodes of the image sensor. When it may be determined, in operation 602, that the image sensor is in an out-focus state, in operation 604, the image sensor may apply a second remosaic algorithm to signals detected from a plurality of photodiodes of the image sensor.

Hereinafter, a method of forming a Bayer-patterned image by an image sensor applying a remosaic algorithm will be described with reference to FIGS. 9 and 10.

Referring to FIG. 10, according to an embodiment, a pixel array 1010 of the image sensor may include a plurality of photodiodes (1011, 1012, 1013, 1014, 1015, 1016, 1017, 1018, . . . ), and the image sensor may detect signals from each of the plurality of photodiodes (1011 to 1014, 1015 to 1018, . . . ).

The image sensor may form a Bayer-patterned image 1020 by converting signals detected from the plurality of photodiodes (1011 to 1014, 1015 to 1018, . . . ).

The Bayer-patterned image may mean a pattern in which green (G) and each of red (R) and blue (B) intersect with each other such that green (G) is 50%, and each of red (R) and blue (B) is 25% depending on visual characteristics of a human. According to an embodiment, for a processor (e.g., the image signal processor 260 of FIG. 2) to perform image signal processing (ISP), it may be necessary for a process of converting the signals detected by the image sensor into Bayer-patterned images.

According to an embodiment, an operation of converting signals detected by the image sensor into Bayer-patterned images may include operations such as rearrangement, synthesis, average, weight, and contrast adjustment of an edge portion of the signals detected by the image sensor. The algorithm applied to the signals detected by the image sensor to form the Bayer-patterned image may be referred to as a remosaic algorithm. The content of the remosaic algorithm may vary for each manufacturer of an image sensor. The algorithm applied to the signals detected by the image sensor to form an image may be collectively referred to as a remosaic algorithm.

Referring to FIG. 9, such the Bayer-patterned image may be formed by applying a remosaic algorithm to the signals detected by an image sensor in the remosaic processing unit 903 of the image sensor 230. Alternatively, according to an embodiment, the Bayer-patterned image may be formed by a processor (e.g., the processor 120 of FIG. 1) in a previous step of Image Signal Processing (ISP) (e.g., the image signal processor 260 of FIG. 2).

Returning to FIG. 6, when it is determined, in operation 602, that an image sensor is in an on-focus state, in operation 603, the image sensor may apply the first remosaic algorithm to the signals detected by the image sensor; when it is determined, in operation 602, that the image sensor is in an out-focus state, in operation 604, the image sensor may apply a second remosaic algorithm to the signals detected by the image sensor.

The first remosaic algorithm may be different from the second remosaic algorithm. According to an embodiment, the first remosaic algorithm may be an algorithm for forming a high-resolution Bayer-patterned image from an in-focus image (by a specific level or more) captured by an image sensor. According to an embodiment, the first remosaic algorithm may be referred to as a resolution-first mode algorithm. The phase difference between signals detected by each photodiode is small, with respect to in-focus images, and thus the Bayer-patterned images may be formed in a direction of maintaining the high resolution.

According to an embodiment, the second remosaic algorithm may be an algorithm for forming the Bayer-patterned image from an out-focus image (by a specific level or more) captured by an image sensor. According to an embodiment, the second remosaic algorithm may be referred to as an artifact-compensation-first mode algorithm. When the image sensor is out of focus, because the signals detected from a plurality of photodiodes have a phase difference, artifacts of the captured image may occur. The artifact may mean a phenomenon that images overlap with one another, when signals with phase difference are converted into high-resolution images.

Because an out-focus image is already out of focus, the priority for the resolution of the image may be low. Accordingly, the Bayer-patterned image may be formed in the direction of minimizing artifacts by applying the second remosaic algorithm for compensating for artifacts. According to an embodiment, the second remosaic algorithm may include image processing such as low pass filtering. The low pass filtering may refer to an image processing method that reduces artifacts by performing blur processing on artifacts occurring at the boundary between objects.

In operation 605, the image sensor may transmit the Bayer pattern, which is obtained by applying the first remosaic algorithm in operation 603 or which is obtained by applying the second remosaic algorithm in operation 604, to a processor (e.g., the processor 120 of FIG. 1), a memory (e.g., the memory 130 of FIG. 1), or a display device (e.g., the display device 160 of FIG. 1). The electronic device (e.g., the electronic device 101 of FIG. 1) may output the Bayer pattern to the display device or may store the Bayer pattern in the memory.

As it is determined, in operation 601, that the image sensor is in not a high-resolution mode but a low-resolution mode, in operation 606, the image sensor may process signals by grouping the signals for each pixel, not for each of a plurality of photodiodes included in the image sensor. For example, referring to FIG. 10, assuming that the high-resolution mode refers to a mode in which the high-resolution Bayer-patterned image is output by processing all signals of the plurality of photodiodes (1011, 1012, 1013, 1014, 1015, 1016, 1017, 1018, . . . ) included in the pixel array 1010 of the image sensor, the low-resolution mode may be a mode in which the low-resolution image is output by grouping and processing signals for each of a plurality of pixels included in the pixel array 1010 of the image sensor. A single pixel of the pixel array 1010 may include four diodes 1011 to 1014, or 1015 to 1018. That is, the low-resolution mode may be a mode in which signals of the four diodes 1011 to 1014 are grouped and processed into a single signal. The resolution of an image output in the low-resolution mode may be lower than the resolution of an image output in the high-resolution mode. However, there is no need to process all of the signals of the plurality of photodiodes (1011, 1012, 1013, 1014, 1015, 1016, 1017, 1018, . . . ), thereby reducing the power consumption of the electronic device.

In the embodiment described above with reference to FIG. 6, it has been described that the on-focus or out-focus state of all the images captured by the image sensor is determined in operation 602, but this is only an example. According to an embodiment, the focused or out-of-focus state may be determined for each frame of an image to apply the corresponding remosaic algorithm for each frame of the image.

Alternatively, according to an embodiment, the extent to which artifacts occur for each area in an image may be determined to apply the corresponding remosaic algorithm for each area. At this time, the high-resolution mode remosaic algorithm or artifact compensation remosaic algorithm may be selectively applied by comparing the disparity calculated for each pixel of the image with a specific reference disparity. Alternatively, at this time, the disparity map for a single image may be formed based on the disparity calculated for each pixel of the image to apply the corresponding remosaic algorithm for each area of the image based on the disparity map.

In the embodiment described above with reference to FIGS. 6 and 8, it has been described that the focused or out-of-focus state of the image captured by the image sensor is determined in operation 602 based on whether the disparity between the left signal image 820 and the right signal image 821 is not less than a threshold value, but this is only an example. In addition to the disparity, it may be determined by further considering the contrast of an edge portion of an object included in the image.

In the embodiment described above with reference to FIGS. 6 and 8, it has been described that the on-focus or out-focus state of the image captured by the image sensor is determined in operation 602 based on the disparity between the left signal image 820 and the right signal image 821, but this is only an example. The disparity between an upper signal image obtained by synthesizing a first signal that is a signal for light incident on the first photodiode 801 through the micro lens 805, and a third signal that is a signal for light incident on the third photodiode 803 and a lower signal image obtained by synthesizing the second signal, that is a signal for light incident on the second photodiode 803, and the fourth signal that is a signal for light incident on the fourth photodiode 804 may be captured to determine the on-focus or out-focus of the image based on the disparity.

According to embodiments disclosed in the specification, it is possible to provide an image sensor that stably implements a high-resolution image by applying the corresponding algorithm processing method for each image or for each image area depending on the extent to which the image captured by the image sensor is in focus, an electronic device including the image sensor, and an operating method thereof.

According to certain embodiments, an image sensor including a pixel, the pixel including a micro lens, a plurality of photodiodes, and a color filter disposed between the plurality of photodiodes and the micro lens; a processor operatively connected to the image sensor; and a memory operatively connected to the processor, wherein the memory stores one or more instructions that, when executed by the image sensor, cause the image sensor to perform a plurality of operations, the plurality of operations comprising: determining whether the image sensor is in a high-resolution mode; when the image sensor is in the high-resolution mode, calculating a disparity based on signals detected from the plurality of photodiodes; when the disparity is not greater than a threshold value, applying a first remosaic algorithm to the signals; and when the disparity is greater than the threshold value, applying a second remosaic algorithm to the signals.

According to certain embodiments, the plurality of photodiodes are arranged in a square shape such that a horizontal number is identical to a vertical number, and the plurality of operations further comprise: synthesizing signals of at least two concatenated photodiodes among the plurality of photodiodes to form a first image; synthesizing signals of at least two photodiodes, which are located to be horizontally or vertically symmetrical with the at least two photodiodes, to form a second image; and calculating the disparity based on the first image and the second image.

According to certain embodiments, the threshold value is determined based on at least one of settings of a user, an environment during shooting of the image sensor, or a result of analyzing an image captured by the image sensor.

According to certain embodiments, the first remosaic algorithm is an algorithm that forms a Bayer-patterned image based on the signals detected by the plurality of photodiodes while maintaining the high resolution.

According to certain embodiments, the second remosaic algorithm is an algorithm that forms a Bayer-patterned image based on the signals detected by the plurality of photodiodes while compensating for an artifact occurring from a phase difference between signals.

According to certain embodiments, the image sensor further includes a plurality of pixels having a structure the same as the pixel, and the plurality of operations further comprise: when the image sensor is in the high-resolution mode, calculating a disparity for each of the plurality of pixels; comparing the calculated disparity for each of the plurality of pixels with the threshold value; and applying the first remosaic algorithm or the second remosaic algorithm for each of the plurality of pixels depending on the comparison of the calculated disparity with the threshold value.

According to certain embodiments, the plurality of operations further comprise: when the result of determining whether the image sensor is in the high-resolution mode indicates that the image sensor is in a low-resolution mode, processing the signals detected from the plurality of photodiodes included in the pixel, as a single signal.

According to certain embodiments, the plurality of operations further comprise: when the disparity is not greater than the threshold value, determining that the image sensor is in a focused state; and when the disparity is greater than the threshold value, determine that the image sensor is in an out-of-focus state.

According to certain embodiments, the second remosaic algorithm includes low pass filtering processing.

According to certain embodiments, whether the image sensor is in the high-resolution mode is determined by a power state of the electronic device, illuminance, or settings of a user.

According to certain embodiments, an image capturing method by an electronic device including an image sensor comprises: determining, by the image sensor, whether the image sensor is in a high-resolution mode; when the image sensor is in the high-resolution mode, calculating a disparity based on signals detected from a plurality of photodiodes included in the image sensor, wherein the image sensor includes a pixel having a micro lens and the plurality of photodiodes facing each other with a color filter interposed between the plurality of photodiodes and the micro lens; when the disparity is not greater than a threshold value, applying a first remosaic algorithm to the signals; and when the disparity is greater than the threshold value, applying a second remosaic algorithm to the signals.

According to certain embodiments, the plurality of photodiodes are arranged in a square shape such that a horizontal number is identical to a vertical number, and the method further comprises: synthesizing signals of at least two concatenated photodiodes among the plurality of photodiodes to form a first image; synthesizing signals of at least two photodiodes, which are located to be horizontally or vertically symmetrical with the at least two photodiodes, to form a second image; and calculating the disparity based on the first image and the second image.

According to certain embodiments, the threshold value is determined based on at least one of settings of a user, an environment during capturing of the image sensor, or a result of analyzing an image captured by the image sensor.

According to certain embodiments, the first remosaic algorithm is an algorithm that forms a Bayer-patterned image based on the signals detected by the plurality of photodiodes while maintaining the high resolution.

According to certain embodiments, the second remosaic algorithm is an algorithm that forms a Bayer-patterned image based on the signals detected by the plurality of photodiodes while compensating for an artifact occurring from a phase difference between signals.

According to certain embodiments, the image sensor further includes a plurality of pixels having a structure the same as the pixel, and the method further comprises: when the image sensor is in the high-resolution mode, calculating a disparity for each of the plurality of pixels; comparing the calculated disparity for each of the plurality of pixels with the threshold value; and applying the first remosaic algorithm or the second remosaic algorithm for each of the plurality of pixels depending on the compared result of the threshold value.

According to certain embodiments, the method further comprises when the result of determining whether the image sensor is in the high-resolution mode indicates that the image sensor is in a low-resolution mode, processing the signals detected from the plurality of photodiodes included in the pixel, as a single signal.

According to certain embodiments, the method further comprises when the disparity is not greater than the threshold value, determining that the image sensor is in a focused state; and when the disparity is greater than the threshold value, determining that the image sensor is in an out-of-focus state.

According to certain embodiments, the second remosaic algorithm includes low pass filtering processing.

According to certain embodiments, whether the image sensor is in the high-resolution mode is determined by a power state of the electronic device, illuminance, or settings of a user.

It should be understood that certain embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Certain embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to certain embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to certain embodiments, each component (e.g., the module or the program) of the above-described components may include one or plural entities. According to certain embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to certain embodiments, operations performed by a module, a programming, or other components may be executed sequentially, in parallel, repeatedly, or in a heuristic method, or at least some operations may be executed in different sequences, omitted, or other operations may be added.

According to embodiments disclosed in the specification, it is possible to provide an electronic device including an image sensor that stably implements a high-resolution image by variously applying the processing method depending on the extent to which the image captured by the image sensor is in focus, and an operating method thereof.

Besides, a variety of effects directly or indirectly understood through the specification may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
an image sensor including an array of pixels, each pixel of the array of pixels including a micro lens, a plurality of photodiodes, and a color filter disposed between the plurality of photodiodes and the micro lens;
a processor operatively connected to the image sensor; and
a memory operatively connected to the processor,
wherein the memory stores one or more instructions that, when executed by the image sensor, cause the image sensor to perform a plurality of operations, the plurality of operations comprising:
determining whether the image sensor is in a high-resolution mode;
according to a determination that the image sensor is in the high-resolution mode, calculating a disparity based on signals detected from the plurality of photodiodes by determining a distance between a first center vertical line of a first image and a second center vertical line of a second image, wherein the first image and the second image are formed based on the signals;
according to a determination that the disparity is not greater than a threshold value, applying a first remosaic algorithm to the signals to obtain a Bayer-patterned image wherein the Bayer-patterned image has a pixel corresponding to each photodiode in the array of pixels, and wherein each alternating location in each row includes a same color value; and
according to a determination that the disparity is greater than the threshold value, applying a second remosaic algorithm to the signals to obtain the Bayer-patterned image, and
wherein the threshold value is based on a user setting.

2. The electronic device of claim 1, wherein the plurality of photodiodes are arranged in a square shape such that a horizontal number of photodiodes is identical to a vertical number of photodiodes, the square shape having a left half and a right half, and
wherein the plurality of operations further comprise:
synthesizing signals of photodiodes of the plurality of photodiodes of the left half to form the first image; and
synthesizing signals of photodiodes of the plurality of photodiodes of the right half, to form the second image.

3. The electronic device of claim 1, wherein the first remosaic algorithm is an algorithm that forms the Bayer-patterned image based on the signals detected by the plurality of photodiodes while maintaining high resolution.

4. The electronic device of claim 1, wherein the second remosaic algorithm is an algorithm that forms the Bayer-patterned image based on the signals detected by the plurality of photodiodes while compensating for an artifact occurring from a phase difference between signals.

5. The electronic device of claim 1,
wherein the plurality of operations further comprise:
applying the first remosaic algorithm to some pixels of the array of pixels and applying the second remosaic algorithm to some pixels of the array of pixels.

6. The electronic device of claim 1, wherein the plurality of operations further comprise:
when a result of determining whether the image sensor is in the high-resolution mode indicates that the image sensor is in a low-resolution mode, processing the signals detected from the plurality of photodiodes included in the each pixel of the array of pixels, as a single signal.

7. The electronic device of claim 1, wherein the plurality of operations further comprise:
when the disparity is not greater than the threshold value, determining that the image sensor is in a focused state; and
when the disparity is greater than the threshold value, determine that the image sensor is in an out-of-focus state.

8. The electronic device of claim 1, wherein the second remosaic algorithm includes low pass filtering processing.

9. The electronic device of claim 1, wherein whether the image sensor is in the high-resolution mode is determined by a power state of the electronic device, illuminance, or settings of a user.

10. An method by an electronic device including an image sensor, the method comprising:
determining, by the image sensor, whether the image sensor is in a high-resolution mode;
according to a determination that the image sensor is in the high-resolution mode, calculating a disparity based on signals detected from a plurality of photodiodes included in the image sensor by determining a distance between a first center vertical line of a first image and a second center vertical line of a second image, wherein the first image and the second image are formed based on the signals, wherein the image sensor includes an array of pixels, each pixel of the array of pixels having a micro lens and the plurality of photodiodes facing each other with a color filter interposed between the plurality of photodiodes and the micro lens;
according to a determination that the disparity is not greater than a threshold value, applying a first remosaic algorithm to the signals to obtain a Bayer-patterned image wherein the Bayer-patterned image has a pixel corresponding to each photodiode in the array of pixels, and wherein each alternating location in each row includes a same color value; and
according to a determination that the disparity is greater than the threshold value, applying a second remosaic algorithm to the signals to obtain the Bayer-patterned image, and
wherein the threshold value is based on a user setting.

11. The method of claim 10, wherein the plurality of photodiodes are arranged in a square shape such that a horizontal number of photodiodes is identical to a vertical number of photodiodes, the square shape having a left half and a right half, the method further comprising:

synthesizing signals of photodiodes of the plurality of photodiodes of the left half to form the first image; and synthesizing signals photodiodes of the plurality of photodiodes of the right half, to form the second image.

12. The method of claim 10, wherein the first remosaic algorithm is an algorithm that forms the Bayer-patterned image based on the signals detected by the plurality of photodiodes while maintaining the high-resolution mode.

13. The method of claim 10, wherein the second remosaic algorithm is an algorithm that forms the Bayer-patterned image based on the signals detected by the plurality of photodiodes while compensating for an artifact occurring from a phase difference between signals.

14. The method of claim 10, the method further comprising:

applying the first remosaic algorithm to some pixels of the array of pixels and applying the second remosaic algorithm to some pixels of the array of pixels.

15. The method of claim 10, further comprising:

when a result of determining whether the image sensor is in the high-resolution mode indicates that the image sensor is in a low-resolution mode, processing the signals detected from the plurality of photodiodes included in the each pixel of the array of pixels, as a single signal.

16. The method of claim 10, further comprising:

when the disparity is not greater than the threshold value, determining that the image sensor is in a focused state; and when the disparity is greater than the threshold value, determining that the image sensor is in an out-of-focus state.

17. The method of claim 10, wherein the second remosaic algorithm includes low pass filtering processing.

18. The method of claim 10, wherein whether the image sensor is in the high-resolution mode is determined by a power state of the electronic device, illuminance, or settings of a user.

* * * * *